United States Patent [19]
Yasumura

[11] Patent Number: 5,640,310
[45] Date of Patent: Jun. 17, 1997

[54] CURRENT RESONANCE TYPE SWITCHING POWER SOURCE

[75] Inventor: Masayuki Yasumura, Kanagawa, Japan

[73] Assignee: Sony Corporation, Tokyo, Japan

[21] Appl. No.: 534,250

[22] Filed: Sep. 26, 1995

[30] Foreign Application Priority Data

Sep. 30, 1994 [JP] Japan ................... 6-259717
Nov. 16, 1994 [JP] Japan ................... 6-305725

[51] Int. Cl.$^6$ .................................. H02M 3/338
[52] U.S. Cl. ................... 363/19; 363/21; 363/97
[58] Field of Search .................. 363/18, 19, 20, 363/21, 22, 23, 24, 25, 133, 97, 37

[56] References Cited

U.S. PATENT DOCUMENTS

| | | | |
|---|---|---|---|
| 4,881,014 | 11/1989 | Okochi ................... | 315/246 |
| 5,171,949 | 12/1992 | Fujishima et al. ........ | 219/10.55 B |
| 5,216,585 | 6/1993 | Yasumura ................ | 363/19 |
| 5,301,095 | 4/1994 | Teramoto et al. ........ | 363/21 |
| 5,321,235 | 6/1994 | Makino et al. .......... | 219/10.55 |
| 5,490,052 | 2/1996 | Yoshida et al. .......... | 363/15 |

FOREIGN PATENT DOCUMENTS 2133940  1/1983  United Kingdom .

*Primary Examiner*—Peter S. Wong
*Assistant Examiner*—Adolf Berhane
*Attorney, Agent, or Firm*—Jay H. Maioli

[57] ABSTRACT

A current resonance type switching power circuit includes a rectifying circuit for rectifying commercial power, a smoothing circuit having a choke coil and a smoothing capacitor for smoothing the output of the rectifying circuit, a switching circuit unit for rendering intermittent the voltage output from the smoothing circuit, and a resonance circuit which includes a primary winding of an insulation transformer and a resonance capacitor and is supplied with a switching output of the switching circuit unit, wherein the resonance circuit is connected to a line between the rectifying circuit and the smoothing circuit so that the resonance output thereof is superposed on the choke coil.

13 Claims, 17 Drawing Sheets

CURRENT RESONANCE TYPE SWITCHING POWER SOURCE

BACKGROUND OF THE INVENTION

1. Field of the Invention

The present invention relates to a current oscillation type switching power circuit having improved power factor, for example.

2. Description of Related Art

Recently, switching elements which are capable of handling to relatively large currents or voltage of high frequency have been developed, and this development of the switching elements promotes the shift of most of power units for rectifying commercial power to obtain a desired DC voltage to switching type power units. The switching power source enables transformers and other equipment to he miniaturized by increasing its switching frequency, and it is used as a large-power DC—DC converter acting as a power source for various electronic equipment.

When commercial power is rectified, current flowing in a smoothing circuit generally has a distorted waveform, and thus there occurs a problem that a power factor indicating the efficiency of the power source is damaged. Furthermore, a countermeasure to suppressing higher harmonics produced due to distorted current waveform is also required. In order to improve the power factor of the power source, it is the simplest manner to use a rectifying circuit having a choke input system, for example, and it is also preferable for the purpose of the countermeasure of electromagnetic noise (EMI). Furthermore, there is also considered a Magnet-Switch system (hereinafter referred to as "MS system" in which an average charging voltage of a smoothing capacitor is reduced by using the interrupted voltage of the switching power source, and a conducting angle of a rectifying element is broadened to improve the power factor.

The applicant of this application has previously proposed an invention in which a power factor improving means of the MS system is applied to a switching power circuit using a current oscillation type converter (Japanese Patent Application No. Hei-6-210740). FIG. 1 is a circuit diagram showing an example of a switching power circuit which is constructed on the basis of the above invention. In this case, it comprises a separately exciting current oscillation converter based on a half bridge.

In FIG. 1, AC represents a commercial alternating power source. An LC low pass filter comprising impedance elements such as a filter choke coil LN and a filter capacitor CN is provided for the alternating power source AC, and it is used to prevent high-frequency noise of a switching frequency from flowing into an AC line. D1 represents a bridge rectifying circuit comprising four diodes, and it performs full-wave rectification on the input alternating power AC. A high-speed recovery type (represented by DFR) is used for each of the two rectifying diodes as indicated by broken lines, and this is because a high-frequency current of the switching frequency as described later flows in a full-wave rectified output line. The full-wave rectified output is charged through a choke coil CH and a tertiary winding N3 into a smoothing capacitor Ci.

Q1, Q2 represents a switching element constituting a half bridge type switching circuit, and in this case it comprises an MOS-FET transistor. These switching elements are connected to each other in series between the positive side of the smoothing capacitor Ci and ground. The switching elements Q1 and Q2 are driven to perform such a switching operation as to be alternately switched on and off by an oscillation drive circuit 2. Each of DD1 and DD2 which are provided in parallel to the switching elements Q1 and Q respectively represents a clamp diode which forms a current path at a switch-off time. Reference numeral 3 represents an actuating circuit. The actuating circuit starts its operation, for example, when the charging for the smoothing capacitor Ci is started at a power-on time and a charge voltage appears in the smoothing capacitor Ci, and actuates the oscillation drive circuit 2.

PIT represents an insulating transformer for transmitting the switching outputs of the switching elements Q1 and Q2 to a secondary side. One end of the primary winding N1 of the insulating transformer is connected to a connection point of the source/drain of the switching elements Q1 and Q2 through a resonance capacitor C1, and the other end is grounded. A series resonance circuit is formed by an inductance component of the insulating transformer PIT containing the resonance capacitor C1 and the primary winding N1. In this case, the primary winding N1 is wound up to form a winding N4, and the winding N4 is connected to a rectifying and smoothing circuit comprising diodes D4 and the capacitor C4 as shown in FIG. 1. Accordingly, direct current obtained in the rectifying and smoothing circuit is supplied to the actuating circuit 3.

Furthermore, a tertiary winding N3 is wound around the insulating PIT, and a switching voltage V3 which is induced by the tertiary winding N3 is applied across the choke coil CH and the smoothing capacitor Ci. That is, the switching voltage is supplied to a charging path of the smoothing capacitor Ci. Accordingly, after passing through the choke coil CH, the rectified full-wave rectified voltage is superposed on the switching voltage and then charged into the smoothing capacitor Ci.

At the secondary side of the insulating PIT, the induced voltage of the secondary winding N2 which is based on the primary winding N1 is converted to a DC voltage by the bridge rectifying circuit D3 and the smoothing capacitor C3, and it is set as an output voltage Eo. A control circuit 1 compares the DC voltage output Eo of the secondary side with a reference voltage, and supplies the oscillation drive circuit 2 with a control signal corresponding to an error (difference) between the DC voltage output Eo and the reference voltage. In the oscillation drive circuit 2, for example, the switching frequency is varied in accordance with the control signal to thereby perform a constant voltage control operation.

In the switching power circuit thus constructed, since the tertiary winding N3 is provided to the insulating transformer PIT in which the resonance current flows in the primary winding N1, the switching voltage which is excited by the tertiary winding N3 is supplied to the charging path of the smoothing capacitor Ci, and superposed on the rectified voltage. Accordingly, the flow angle of the current flowing out from the bridge rectifying circuit D1 is enlarged, so that the average value thereof becomes a charging current which is close to a sine wave. As a result, the alternating current which is supplied from the commercial alternating power source is reduced in distortion of higher harmonics, and the power factor is improved.

The current I1 which flows out from the rectifying circuit is interrupted at the switching period, and flows discontinuously. Therefore, a high-speed recovery type is required to be used for any two diodes of the bridge rectifying circuit D1. In FIG. 1, two diodes at the anode side as indicated by a broken line DFR are the high-speed recovery type.

Furthermore, the applicant of this application previously proposed a switching power unit in which an magnetically-coupled transformer for exciting a voltage corresponding to a switching output in a choke coil from a primary side or secondary side of an insulating transformer is provided, and the rectified output of the bridge rectifying circuit is superposed on the voltage of the switching period by the magnetically-coupled transformer, thereby improving the power factor (Japanese Patent Application No. Hei-6-192737). With this switching power unit, variation of the rectified and smoothed voltage Vi can be more easily controlled by the circuit shown in FIG. 1.

FIG. 2 is a circuit diagram showing an example of a switching power unit having the magnetically-coupled transformer as described above. In this case, the switching power unit is based on a half bridge type of self-exciting type current resonance switching power unit using transistors for the switching elements Q1 and Q2. The same elements as FIG. 1 are represented by the same reference numerals, and the description thereof is omitted.

The switching elements Q1 and Q2 of this circuit are connected to each other through their collectors and emitters between the connection point of the anode side of the smoothing capacitor Ci and ground. R6 represents an actuating resistor, and DD1 and DD2 which are interposed between each base-emitter of the switching elements Q1 and Q2 respectively represent damper diodes. R5 represents a base current (drive current) adjusting resistor for the switching elements Q1 and Q2. C5 represents resonance capacitor, and it forms a resonance circuit for self-exciting oscillation together with driving windings NB of a drive transformer PRT as described later.

PRT represents a drive transformer for variably controlling the switching frequency of the switching elements Q1 and Q2, and in the case of FIG. 2, it is designed as an orthogonal type saturable reactor in which driving windings Nb and a resonance current detection winding ND are wound around the drive transformer, and further a control winding NC is wound in a direction perpendicular to each of the above windings. One end of the drive winding NB at the switching element Q1 side of the drive transformer PRT is connected to a capacitor C5 while the other end thereof is connected to an emitter of the switching element Q1. One end of the driving winding NB at the switching element Q2 side is connected to the ground while the other end thereof is connected to the capacitor C5, so that this driving winding NB is supplied with a voltage having the opposite polarity to that of the driving winding NB of the switching element Q1. One end of current detection winding ND is connected to a primary winding N3 of a magnetically-coupled transformer MCT, and the other end thereof is connected to a primary winding N1 of an insulating transformer PIT through a resonance capacitor CI.

PIT represents an insulating transformer for transmitting the switching outputs of the switching elements Q1 and Q2 to the secondary side, and one end of the primary winding N1 of the insulating transformer PIT is connected through the resonance capacitor C1 to the current driving winding ND in series while the other end thereof is grounded. An inductance component of the insulating transformer PIT which contains the resonance capacitor C1 and the primary winding N1 forms the resonance circuit. At the secondary side, the induced voltage which is induced at the secondary winding N2 by the output of the switching output flowing in the primary winding N1 is converted to a DC voltage by the bridge rectifying circuit D3 and the smoothing capacitor C3, and output as an output voltage Eo. A control circuit 1 compares the DC voltage output Eo of the secondary side with a reference voltage and supplies the DC current corresponding to the difference (comparison result) to the control winding NC of the drive transformer PRT as a control current.

In FIG. 2, MCT represents a magnetically-coupled transformer. In this magnetically-coupled transformer MCT, a secondary winding Ni (Li represents self-inductance) corresponding to the choke coil CH in FIG. 1 and a winding N3 (inductance L3) corresponding to the tertiary winding of the insulating transformer PIT are set as a first winding, and closely coupled to each other, for example, in a winding ratio of 1:1 by a ferrite core. The primary winding N3 of the magnetically-coupled transformer MCT is connected to the primary winding N1 of the insulating transformer PIT in series through the resonance capacitor C1 and the current detection winding ND.

A switching operation of the switching power source thus constructed will be described.

First, upon power-on of the commercial alternating power source, base current is supplied to the bases of the switching elements Q1 and Q2 through the actuating resistors R6. If the switching element Q1 is previously switched on, the switching element Q2 is controlled to be switched off. At this time, resonance current flows from the current detection winding ND through the capacitor C1 to the primary winding N1 as the output of the switching element Q1. In this case, the switching elements Q2 and Q1 are controlled to be switched on and off respectively when the resonance current is equal to zero or a near value. At this time, the resonance current flows through the switching element Q2 in the opposite direction to the direction as described above. Subsequently, such a self-exciting switching operation that the switching elements Q1 and Q2 are alternately switched on is started. As described above, the switching elements Q1 and Q2 are repetitively alternately switched on and off using the terminal voltage of the smoothing capacitor as an operating power, whereby a drive current whose waveform is close to the resonance current waveform is supplied to the winding N1 of the primary side of the insulating transformer, and the alternating output is obtained at the winding N2 of the secondary side.

When the DC output voltage (Eo) at the secondary side is lowered, the current flowing in the control winding NC is controlled by the control circuit 1 so that the switching frequency is lowered (approaches the resonance frequency) and thus the drive current flowing in the primary winding N1 increases, thereby keeping the voltage constant.

As a power factor improving operation, the switching voltage corresponding to the resonance current flowing in the insulating transformer PIT is excited to a self-inductance Li of the secondary winding Ni by the primary winding N3 in the magnetically-coupled transformer MCT. Accordingly, the full-wave rectified voltage is superposed on the switching voltage at the winding Ni of the self-inductance Li, and then charged in a smoothing capacitor Ci. Accordingly, the terminal voltage of the smoothing capacitor Ci is reduced at the switching frequency by the amount of the superposed switching voltage. With this operation, the charge current flows for a period when the terminal voltage of the capacitor Ci is lower than the rectified voltage level of the bridge rectifying circuit. By setting the winding number of the magnetically-coupled transformer MCT or the like so that the period continues until it approaches a value near to zero volts, the power factor can be set approximately to 1. That is, the average alternating input current has a similar waveform to the AC voltage waveform, thereby improving the power factor.

In a power circuit using a magnetically-coupled transformer, the drive current of the insulating transformer PIT is reduced when a light load is imposed, and thus a small switching signal is induced at the secondary side of the magnetically-coupled transformer MC by the drive current. Accordingly, the level of the charging current is low when a light load is imposed, and it is high when a heavy load is imposed. Therefore, the terminal voltage of the smoothing capacitor can be prevented from abnormally increasing, particularly when the light load is imposed, and the improvement of regulation which is difficult using an ordinary MS system can be performed. Therefore, variation of the rectified smoothing voltage Vi due to variation of the alternating input voltage of VAC±20% can be suppressed, so that it is unnecessary to aim at the improvement of breakdown voltages of the switching elements Q1 and Q2, the smoothing capacitor Ci, etc.

FIG. 3 is a circuit diagram showing a half bridge type switching power circuit of the self-exciting current resonance type, and the same elements as FIG. 2 are represented by the same reference numerals, and the description thereof is omitted.

In this circuit diagram, the drive transformer comprises a CDT (Converter Drive Transformer) for driving the switching elements Q1 and Q2 at a predetermined switching frequency. The converter transformer for transmitting the switching output of the primary side to the secondary side comprises an insulating transformer PRT (Power Regulation Transformer) which is provided with a control winding NC. The control winding NC is supplied with the control current corresponding to the DC voltage Eo from the control circuit 1 to change the saturated characteristic of the insulating transformer PRT and control leaking magnetic flux, thereby performing a constant-voltage control (it is also called as "series resonance frequency control system").

The primary winding N3 of the magnetically-coupled transformer MCT of this circuit is connected to both ends of the winding N4 at the secondary side of the insulating transformer PRT, so that it is supplied with a voltage having the switching frequency which is excited at the secondary winding N4. With this construction, the same improvement of the power factor as described with reference to FIG. 2 can be performed through the operation of the magnetically-coupled transformer MCT. The secondary winding N4 is connected to a full-wave rectifying smoothing circuit comprising diodes D4 and D5 and a capacitor C4, whereby a DC output voltage E1 can be supplied therefrom.

FIG. 4 is a perspective view showing the construction of the magnetically-coupled transformer MCT used in the embodiments of FIGS. 2 and 3. In this case, E-shaped cores CR1 and CR2 formed of ferrite material are combined with each other so that the magnetic legs thereof are confronted to each other, thereby forming an EE-shaped core. at this time, and a gap G is formed between the center magnetic legs of the E-shaped cores as shown in FIG. 4. A primary winding Ni and a secondary winding N3 are wound around the respective center magnetic legs to construct a magnetically-coupled transformer.

In the circuit shown in FIG. 2, the magnetically-coupled transformer needs some degree or size if it is to be endurable against a heavy load above 200 W, and thus it is difficult to miniaturize the magnetically-coupled transformer. Furthermore, in the circuit shown in FIG. 3, the primary winding Ni of the magnetically-coupled transformer MCT is a circuit element of the primary side of the insulating transformer PRT while the secondary winding N3 is connected to the low voltage output winding N4 of the secondary side of the insulating transformer PRT, so that it is required to perform a winding operation on the magnetically-coupled MCT while keeping an insulation distance between the primary winding Ni and the secondary winding N3. Therefore, miniaturization of the magnetically-coupled transformer is also difficult in this case.

SUMMARY OF THE INVENTION

An object of the present invention is to provide a current resonance type switching power circuit having an improved power factor, which can be designed in compact size, light weight and low cost.

Another object of the present invention is to provide a current resonance type switching power circuit which is improved in electrical characteristics.

In order to attain the above objects, a current resonance type switching power circuit according to the present invention includes a rectifying circuit for rectifying commercial power, a smoothing circuit comprising a choke coil and a smoothing capacitor for smoothing the output of the rectifying circuit, a switching circuit unit for rendering intermittent the voltage output from the smoothing circuit, and a resonance circuit which comprises a primary winding of an insulation transformer and a resonance capacitor and is supplied with a switching output of the switching circuit unit, wherein the resonance circuit is connected to a line between the rectifying circuit and the smoothing circuit so that the resonance output thereof is superposed on the choke coil.

A normal-mode low pass filter may be provided at the output side of the rectifying circuit, and a filter choke coil of the low pass filter and a high-speed recovery type diode are inserted in series into a charging path of the smoothing capacitor together with the choke coil, and the filter capacitor constituting the low pass filter is connected to the anode of the smoothing capacitor. The resonance capacitor may be divided into plural parts and connected to the output side of the rectifying circuit, whereby a power factor can be set and adjusted.

Furthermore, in the case of a self-exciting system, the switching frequency of the switching circuit unit can be varied, or the magnetic flux of the insulation transformer can be varied on the basis of the DC output voltage obtained at the secondary side of the insulation transformer, thereby perform a constant voltage control. Still furthermore, the switching circuit unit may be designed as a separately exciting current resonance type converter to vary a switching driving signal on the basis of the DC output voltage obtained at the secondary side of the insulation transformer, thereby performing the constant voltage control. The above construction is applicable when the switching circuit unit is any one of a half bridge system and a full bridge system.

The choke coil of the switching power circuit of the present invention may be regarded as being equivalent to a magnetically-coupled transformer from which a secondary winding is omitted, and thus the transformer constituting the choke coil can be miniaturized. Furthermore, the omission of the secondary winding of the magnetically-coupled transformer reduces a power loss of the transformer, so that the efficiency can be improved.

Furthermore, when the LC low pass filter and the high-speed recovery type diode are provided at the output side of the rectifying circuit, the surge current can be suppressed by synthesizing the resistance components of the LC low pass filter, the high-speed recovery type diode and the choke coil, so that it is unnecessary to insert a rush current limiting resistor into the AC line. The filter capacitor of the LC low pass filter is connected between the connect point of the filter choke coil and the high-speed recovery type diode and the anode of the smoothing capacitor, so that the voltage applied across both ends of the filter capacitor can be reduced more than when it is inserted into the AC line. Furthermore, when the output side of the rectifying circuit is connected to the primary winding through the divided series resonance capacitor, tire power factor can be variably set by altering the capacity of the divided resonance capacitor.

Still furthermore, the resonance capacitor is provided so that a parallel resonance circuit or a series resonance circuit is formed in combination with the inductance of the choke coil, whereby the alternating input voltage is increased and the increase of the rectified and smoothed voltage when a light load is imposed can be suppressed. In addition, the construction as described above can be applied to a power circuit having a voltage doubler rectifying circuit, According to the present invention, in various current resonance type switching power circuits containing a voltage doubler rectifying circuit, a choke coil corresponding to a magnetically-coupled transformer from which a secondary winding is omitted is provided to enable the transformer of the choke coil to be miniaturized more than when the magnetically-coupled transformer is designed, so that the cost can be further reduced and the power circuit can be designed in more compact size. The omission of the secondary winding of the magnetically-coupled transformer reduces the power loss, so that the efficiency can be also improved.

Furthermore, the LC low pass filter and the high-speed recovery type diode are provided at the output side of the rectifying circuit, and the filter capacitor is connected to the anode of the capacitor, so that a large-size rush current limiting resistor can be removed. In addition, it is not required to adopt a filter capacity meeting safety requirements, and thus an ordinary part may be used. Therefore, the size can be reduced, and the cost can be also reduced. When the resonance capacitor is divided and connected, any power factor can be set in accordance with an actual using condition while considering the balance with various conditions such as a power conversion efficiency, etc.

Still furthermore, if the resonance capacitor is connected to form a choke coil and a resonance circuit, the upper limit of the alternating input voltage of about AC 300 V and the upper limit of the rectified and smoothed voltage when a light load is imposed are suppressed by the action of the resonance circuit. Accordingly, even when a switching circuit which will be used in a foreign country such as Europe is manufactured, parts such as an electrolytic capacitor for a smoothing capacitor, a switching element, a series resonance capacitor which have the same level of breakdown voltages as a circuit before the improvement of the power factor can be selected. Therefore, the cost can be reduced while improving the power factor.

DETAILED DESCRIPTION OF THE PREFERRED EMBODIMENTS

Preferred embodiments according to the present invention will be described hereunder with reference to the accompanying drawings.

Figure 5:
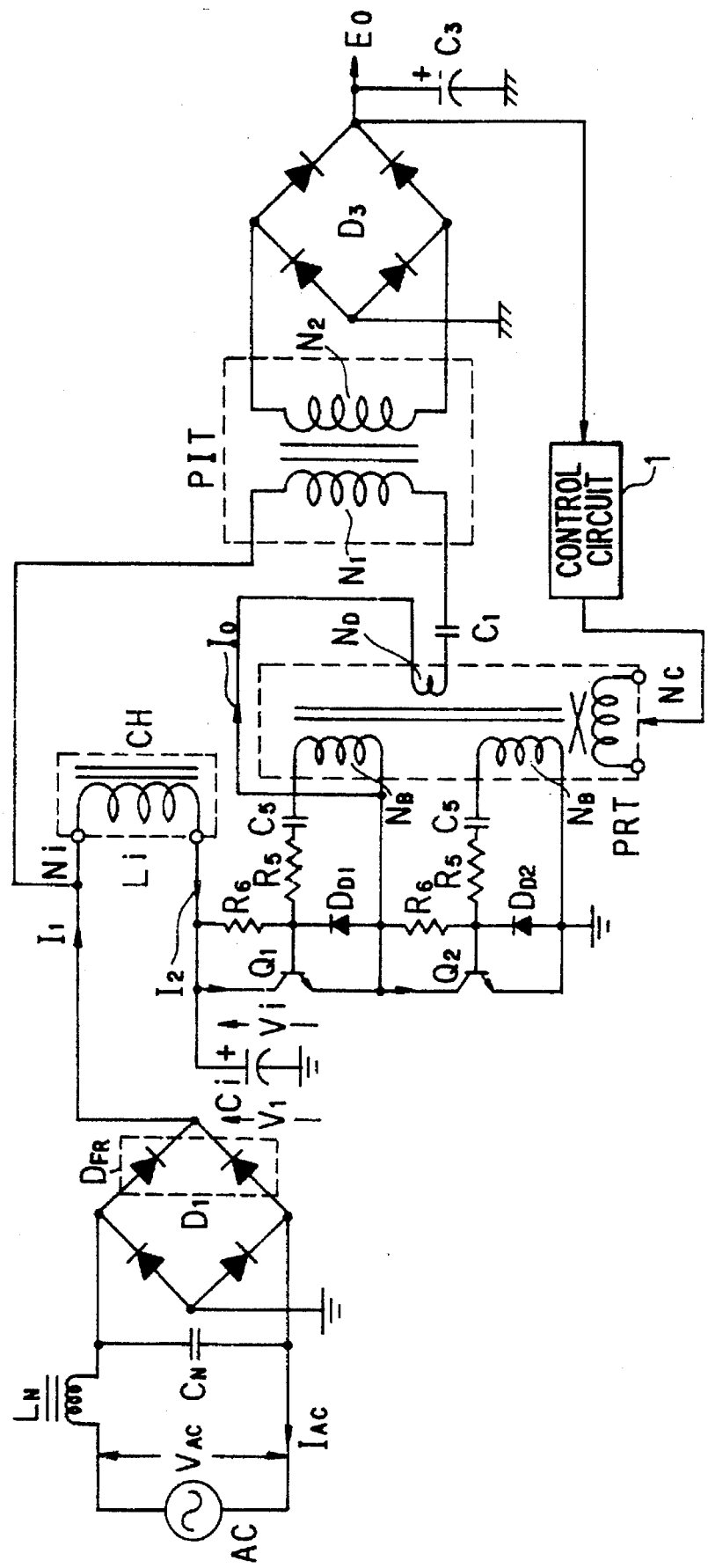
FIG. 5 is a circuit diagram showing a switching power circuit of an embodiment of the present invention.

FIG. 5 is a circuit diagram showing a switching power circuit of an embodiment according to the present invention. In this embodiment, the switching power circuit comprises a half bridge type of self-exciting current resonance type switching power circuit. The same elements as FIG. 2 are represented by the same reference numerals, and the description thereof is omitted.

The circuit of this embodiment is provided with a choke coil CH having a winding Ni which is inserted between the rectified output side of a bridge rectifying circuit D1 and the anode of the smoothing capacitor Ci. One end of the primary winding N1 of the insulating transformer PIT is connected to a connection point of the emitter-collector of the switching elements Q1 and Q2 through a resonance capacitor C1 and a current detection winding ND, and the other end of the primary winding N1 is connected to a connection point between the choke coil CH and the full-wave rectified output terminal of the bridge rectifying circuit (not connected to the ground).

Figure 2:
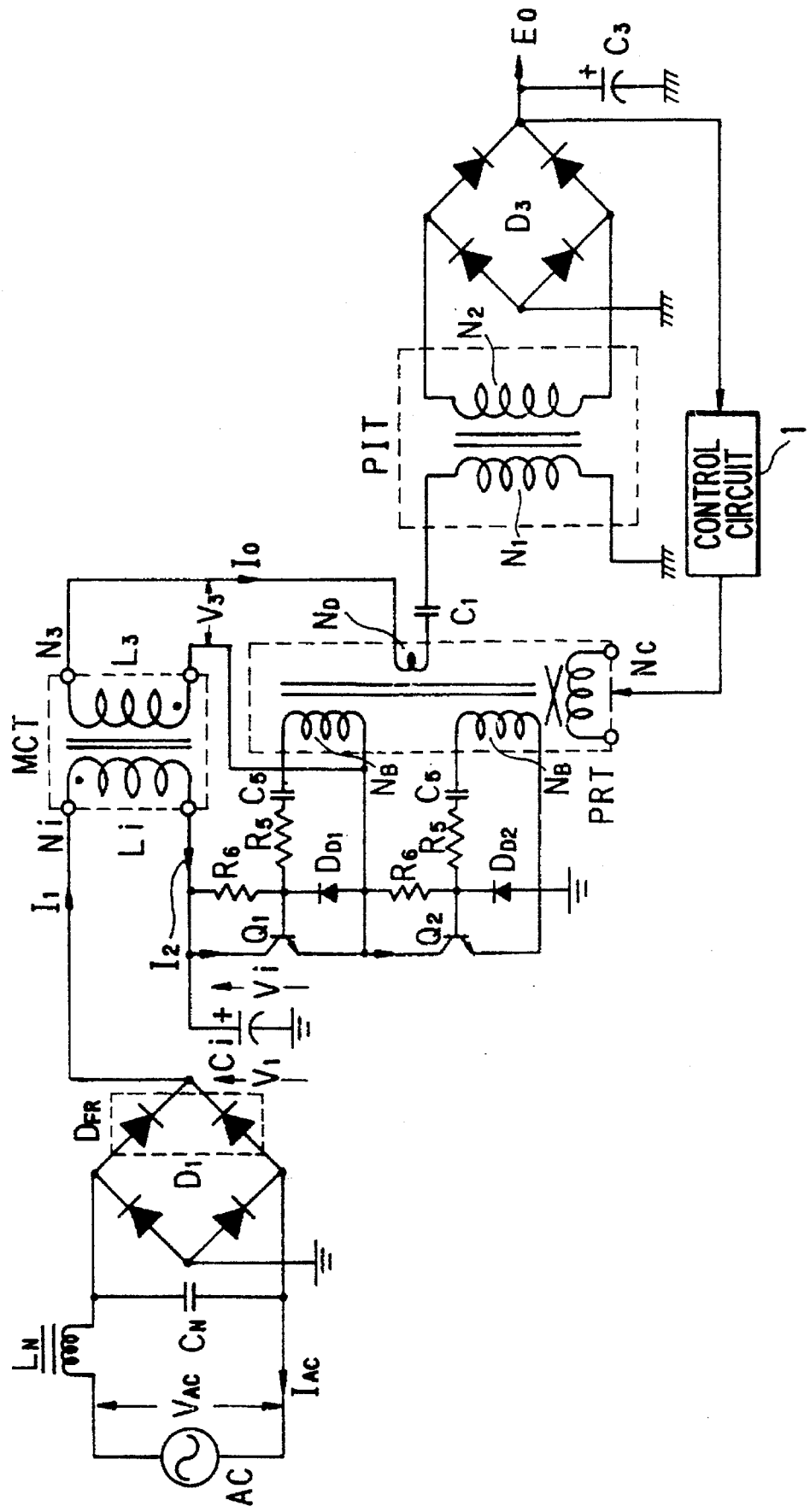
FIG. 2 is a circuit diagram showing a conventional switching power circuit.

That is, the circuit construction of this embodiment is designed as follows. the primary winding N3 and the secondary winding Ni which are coupled at a winding ratio of 1:1 of the magnetically-coupled transformer MCT shown in FIG. 2, are omitted and the primary winding N1 of the insulating transformer and the series resonance circuit of the resonance capacitor C1 are connected to the choke coil CH of the full-wave rectified output line. This circuit is designed so that the switching output corresponding to the resonance current flowing in the primary winding N1 of the insulating transformer PIT is directly supplied to the self-inductance Li of the secondary winding Ni, whereby the switching voltage is superposed on the full-wave rectified voltage and charged into the smoothing capacitor Ci. Accordingly, the power factor is improved by the same action as described with reference to FIG. 2, and the same effect can be obtained.

Figure 6:
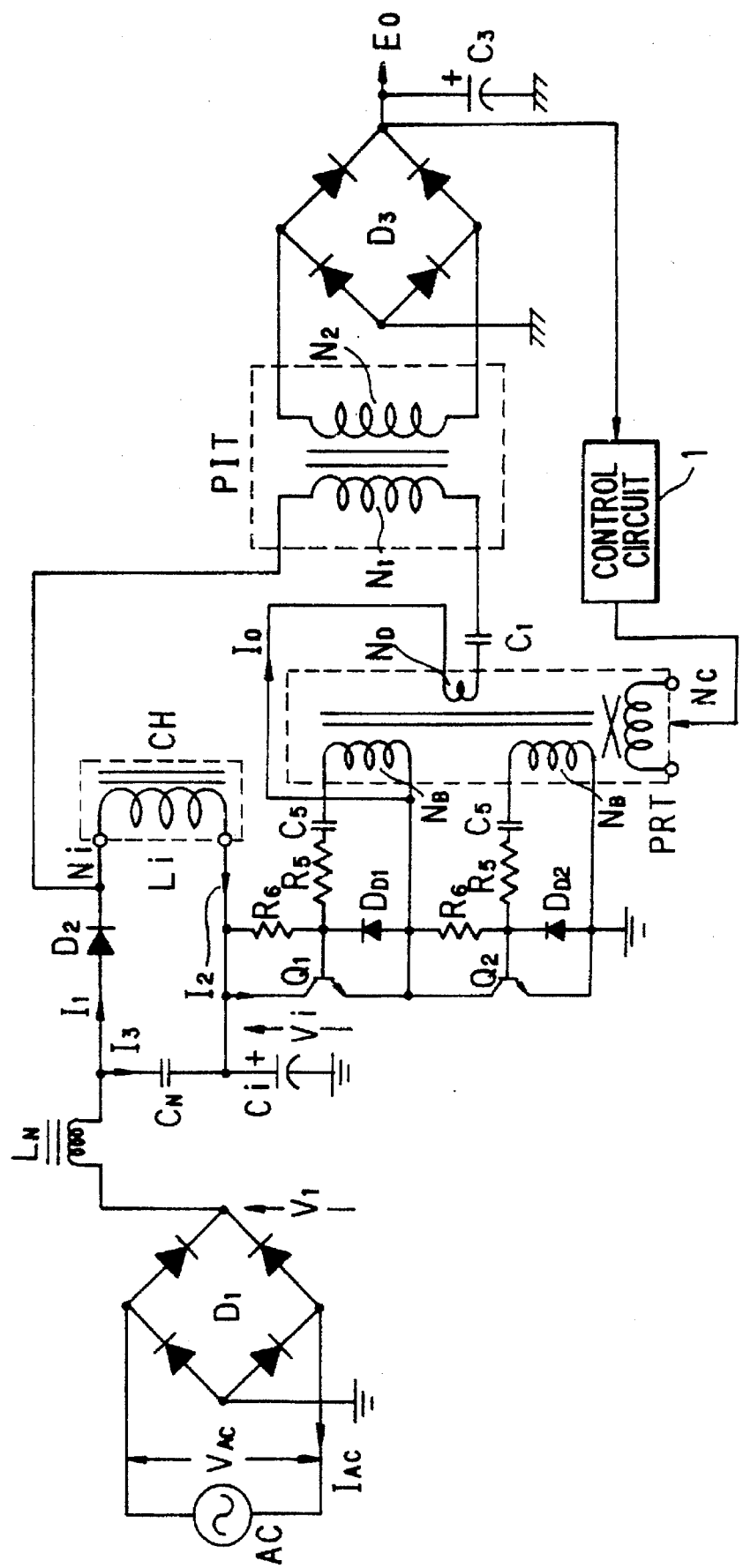
FIG. 6 is a circuit diagram showing a switching power circuit of another embodiment.

FIG. 6 shows a switching power circuit of another embodiment according to the present invention. The same elements as in FIG. 5 are represented by the same reference numerals, and the description thereof is omitted. In the circuit shown in FIG. 6, a low-speed recovery type diode is used for all of the diodes constituting the bridge rectifying circuit D1. Therefore, a single packaged part may be used as the bridge rectifying circuit D1, so that miniaturization of the circuit and reduction in cost can be performed.

In this embodiment, an LC low pass filter comprising a filter choke coil LN and a filter capacitor CN is provided at the rectified output side of the bridge rectifying circuit D1. That is, the filter choke coil which is connected to a diode D2 in series is inserted into a line between the rectified output terminal of the bridge rectifying circuit and the choke coil CH, and the filter capacitor CN is inserted between a connection point of the filter choke coil LN and the diode D2 and the anode of the smoothing capacitor Ci. The diode D2 comprises a high-speed recovery type diode, and its anode is connected to the filter choke coil LN side while its cathode is connected to the winding Ni side as shown in FIG. 6, whereby the high-frequency of the switching frequency is prevented from flowing into the AC line side.

According to the construction as described above, the filter choke coil LN, the high-speed recovery type diode D2 and the winding Ni are inserted in the line between the rectified output terminal of the bridge rectifying diode and the smoothing capacitor Ci while connected to one another in series. If a value obtained by synthesizing the resistance components of these elements is set to such a value that rush current at a power-on time can be suppressed to a desired level, and a rush current limiting resistor Ri ordinarily inserted in the AC line can be omitted. In addition, power consumption is dispersed by the resistance components of the respective elements, and thus heating can be suppressed.

Furthermore, one end of the filter capacitor CN is not directly grounded, and it can be connected to the anode of the smoothing capacitor Ci as shown in FIG. 6. With this connection, the voltage applied across both ends of the filter capacitor CN can be reduced to an extremely lower value than when it is inserted in the AC line. For example, it is unnecessary to use a part which meets a safety requirement, and thus an ordinary part may be used. Therefore, the size can be made small and the cost can be reduced.

Figure 4:
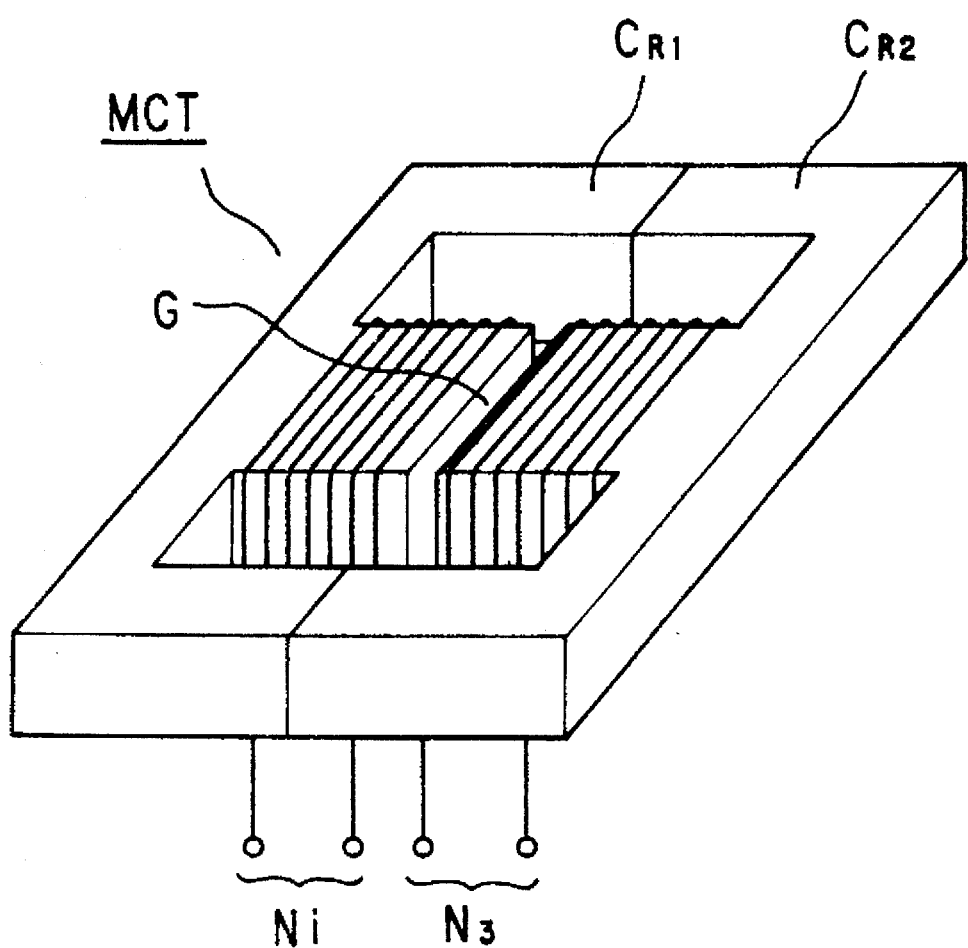
FIG. 4 is a perspective view showing the construction of a magnetically-coupled transformer.
Figure 7:
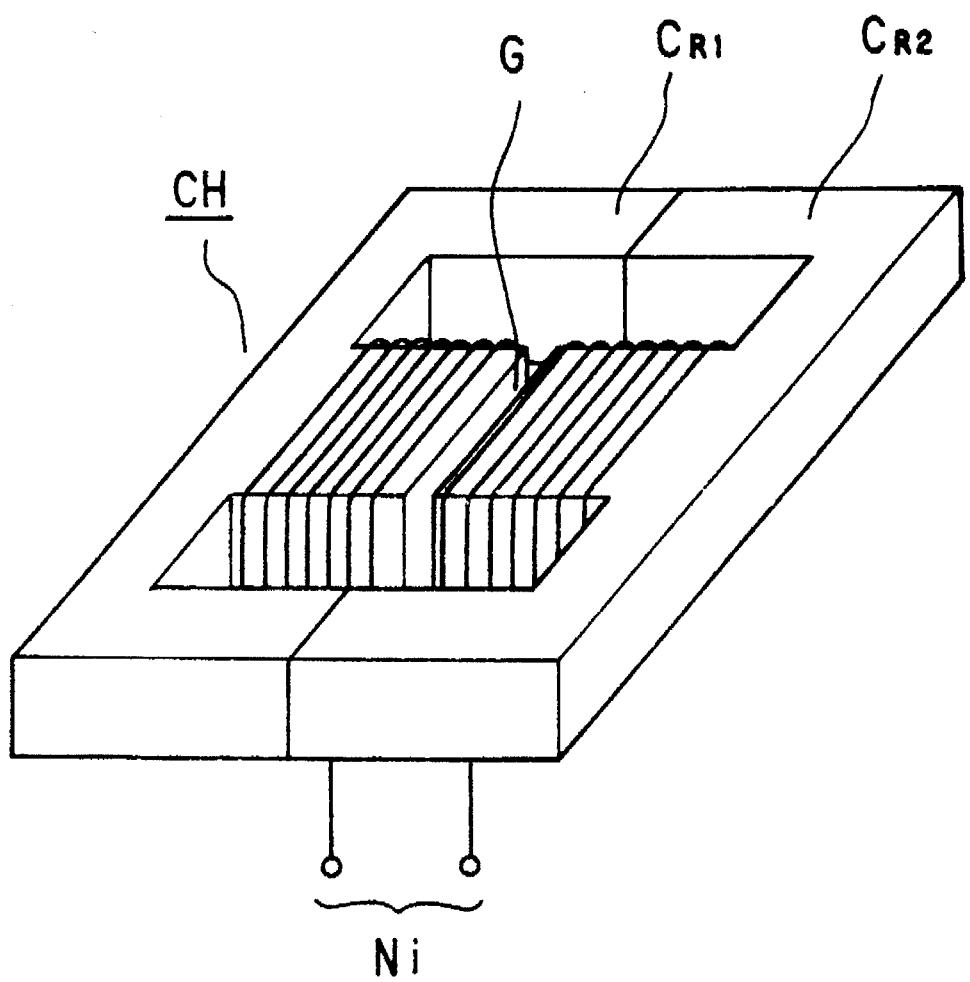
FIG. 7 is a perspective view showing the construction of a choke coil of the embodiment.

FIG. 7 is a perspective view showing the structure of the choice coil CH which is usable in the circuit shown in FIGS. 5 and 6. A core of this embodiment is the same EE-shaped core as the magnetically-coupled transformer MCT shown in FIG. 4, which is formed by combining two E-shaped cores CR1 and CR2 of ferrite materials so that a gap G is formed between the center legs thereof. In this case, only the winding Ni is wound around the center legs to form the choke coil CH.

Therefore, under the same load condition, the choke coil of the above-mentioned embodiment shown in FIGS. 5 and 6 can be designed in more compact size and lighter weight than the magnetically-coupled transformer MCT. Therefore, the actual circuit size of the device of the embodiment shown in FIGS. 5 and 6 can be made more compact than the circuits shown in FIGS. 1 to 3. Furthermore, in the switching power circuit shown in FIG. 6, the omission of the rush current limiting resistor of the AC line, the packaging of the rectifying bridge circuit and use of a filter capacitor LN having an ordinary breakdown voltage can be performed, so that the size of a substrate and the cost can be reduced as compared with the circuit shown in FIG. 5.

Figure 8:
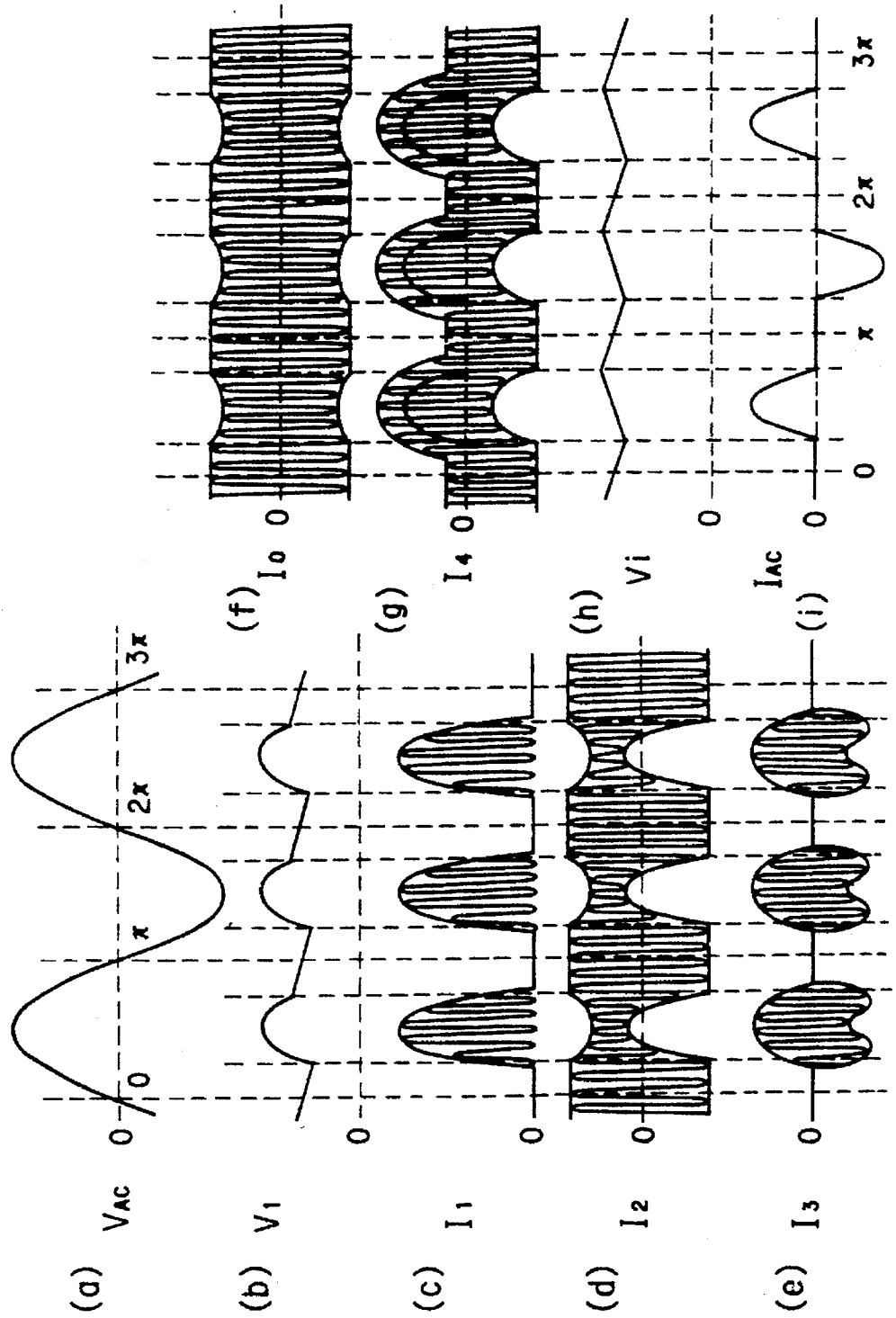
FIG. 8 is a waveform diagram showing an operation of a switching power circuit of another embodiment.

FIG. 8 is a waveform diagram showing an operation of each part of the switching power circuit. For example, FIG. 8 shows a case where the circuit is designed so that a power factor of 0.85 can be obtained. When an alternating input voltage VAC is supplied as shown in (a) of FIG. 8, the full-wave rectified output voltage V1 of the bridge rectifying circuit becomes a waveform shown in (b) of FIG. 8, and at this time current I1 on the full-wave rectified output line flows as shown in (c) of FIG. 8. The current I1 flows through the high-speed recovery type diode d2 while superposed on the high frequency of the switching frequency as shown in (c) of FIG. 8. At this time, resonance current I0 flows through the resonance capacitor C1 and the primary winding N1 into a charge line to the smoothing capacitor Ci as show in (f) of FIG. 8, and thus current I2 which flows through the winding Ni of the choke coil on the charge line is shown in (d) of FIG. 8, so that the component of the resonance current I0 is fed back during a quiescent period as shown in (d) of FIG. 8.

At this time, high-frequency current I3 which flows from the smoothing capacitor Ci through the filter capacitor CN of the LC low pass filter to the ground is shown in (e) of FIG. 8. Accordingly, current I4 of switching frequency which actually flows into the smoothing capacitor Ci has a waveform shown in (g) of FIG. 8. The terminal voltage V1 of the smoothing capacitor Ci is shown in (h) of FIG. 8. The alternating input current IAC flowing in the alternating power AC has a waveform shown in (i) of FIG. 8, and actually a conduction angle is enlarged to such an extent that the power factor is equal to 0.85.

Figure 1:
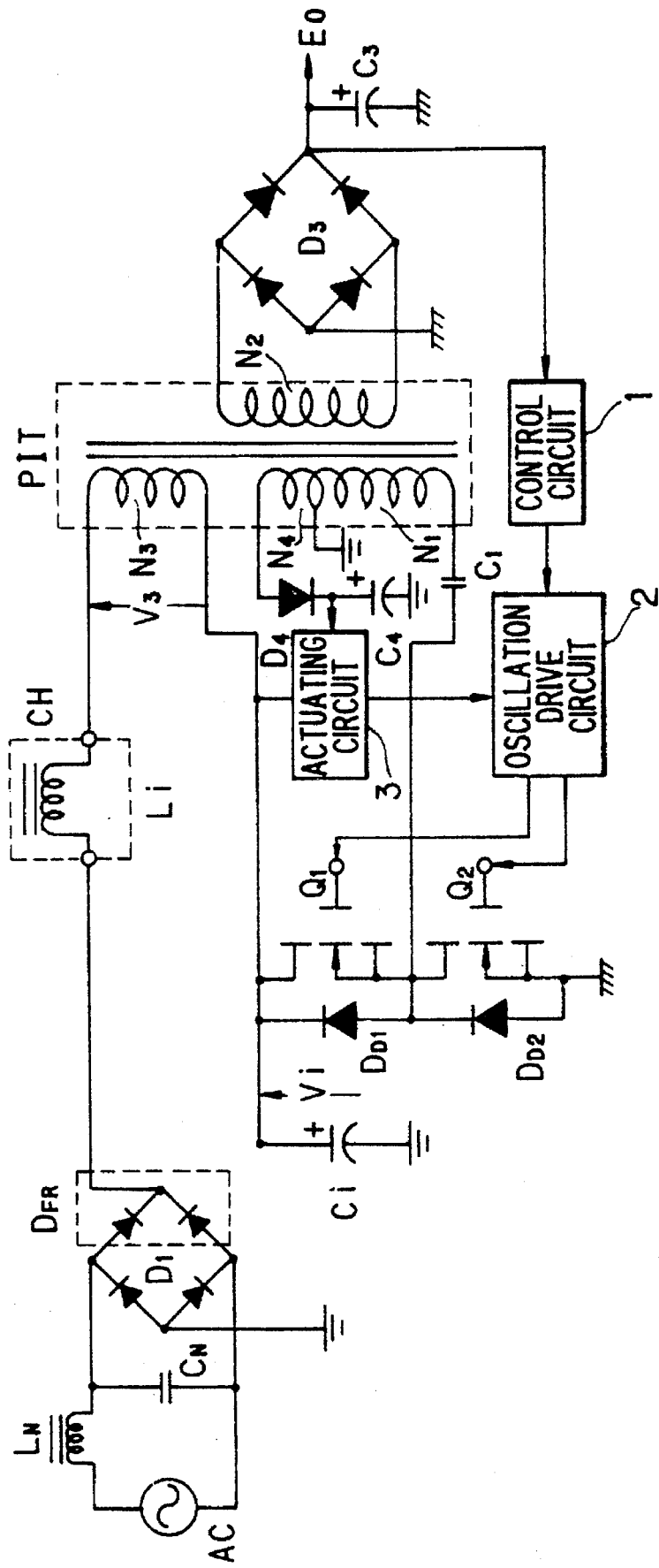
FIG. 1 is a circuit diagram showing a conventional switching power circuit.
Figure 9:
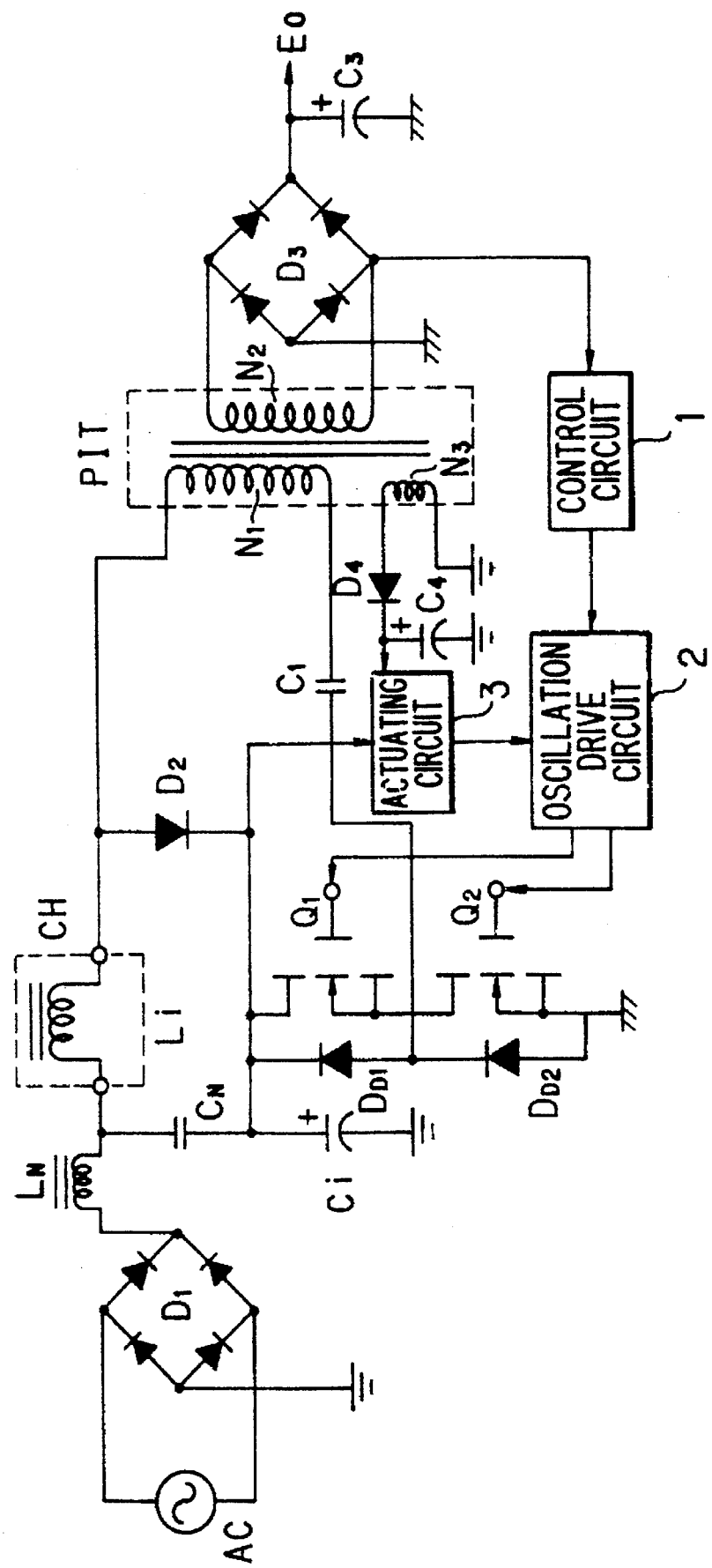
FIG. 9 is a circuit diagram showing a switching power circuit orfanother embodiment.

FIG. 9 is a circuit diagram showing a switching power circuit of another embodiment according to the present invention. In this embodiment, a half bridge type of separately exciting current resonance switching power circuit is provided. The same elements as FIGS. 5, 6 and 1 are represented by the same reference numerals, and the description thereof is omitted. In this case, since the circuit is of a separate excitation type, the primary winding N1 of the insulating transformer is connected through the resonance capacitor to the connection point of the source-drain of the switching elements Q1 and Q2 each comprising an MOS-FET, so that the switching current flows in the resonance circuit.

In this embodiment, the LC low pass filter is provided at the output side of the bridge rectifying circuit D1 like the case shown in FIG. 6, however, the connection order of the high-speed recovery type diode D2 and the choke coil CH is opposite to that of the case shown in FIG. 6. In this connection mode, the power factor can be also improved by the same action as shown in FIG. 6, and the rush current limiting resistor of the AC line can be also omitted. In this circuit, a low DC voltage is obtained by a tertiary winding N3, a diode D4 and a capacitor C4 which are provided to the insulating transformer, and supplied to the actuating circuit 3.

Figure 10:
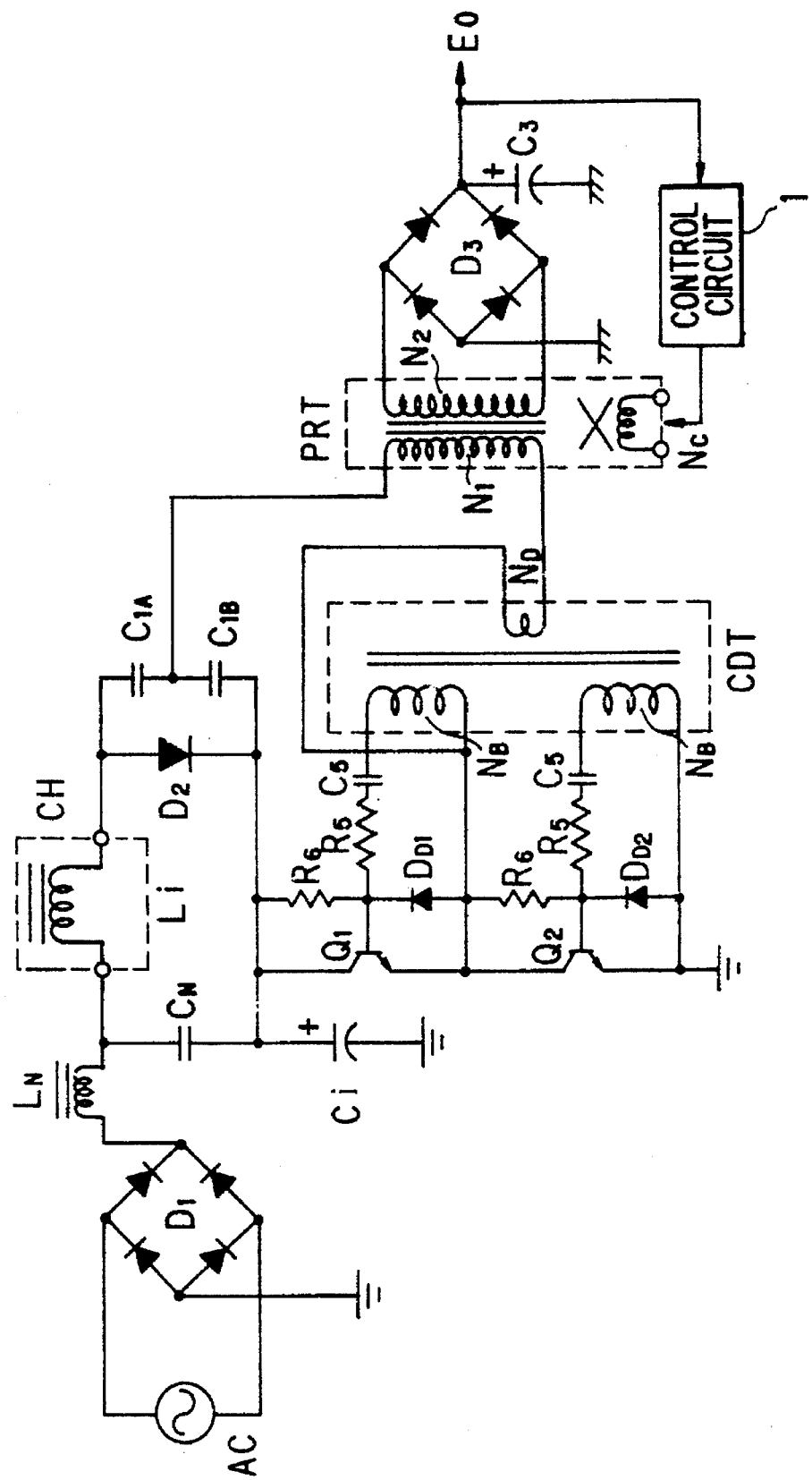
FIG. 10 is a circuit diagram showing a switching power circuit of another embodiment.

FIG. 10 shows a half bridge type of self-exciting current resonance switching power circuit of another embodiment.

Figure 3:
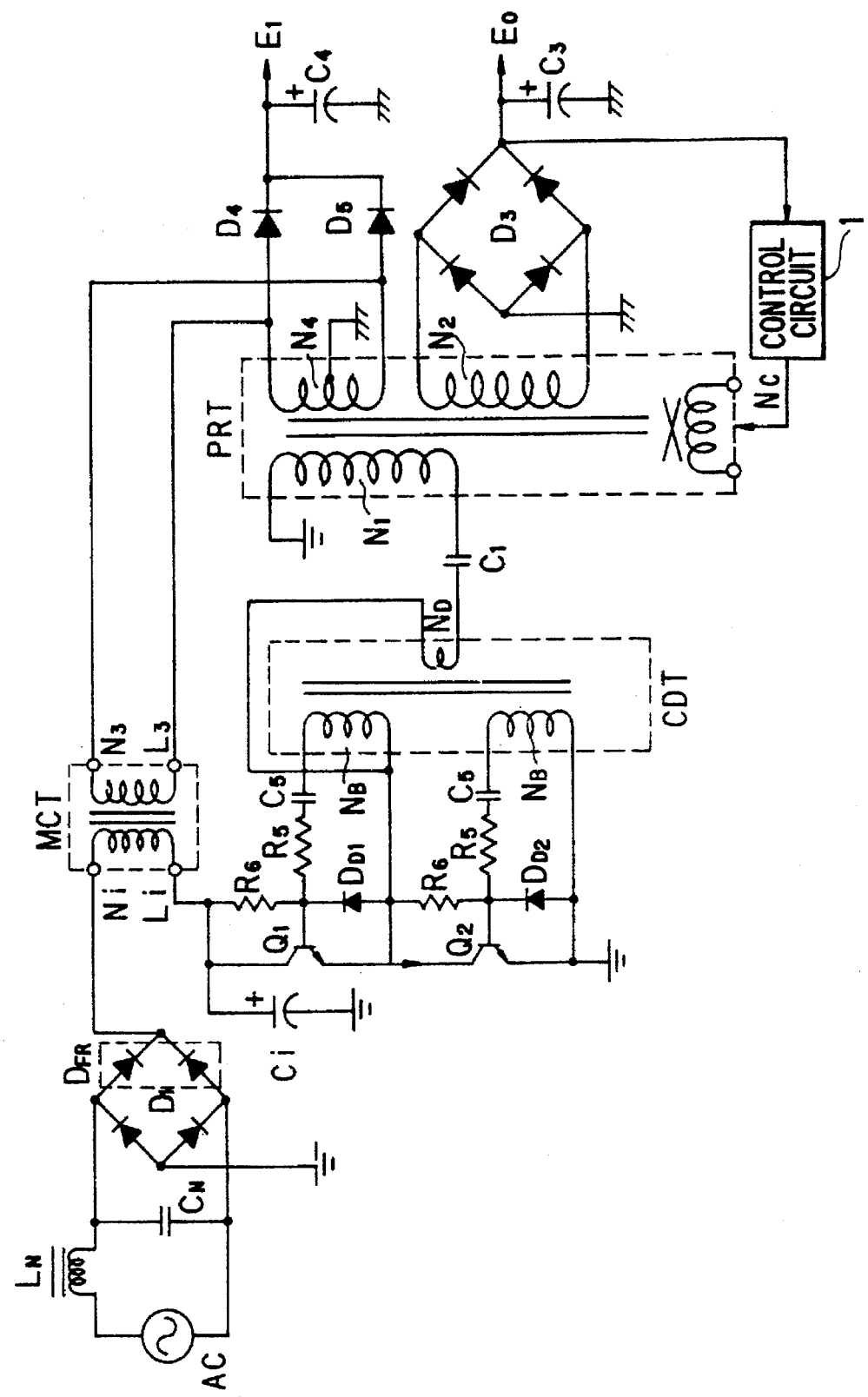
FIG. 3 is a circuit diagram showing a conventional switching power circuit.

The same elements as FIGS. 6, 9 and 3 are represented by the same reference numerals, and the description thereof is omitted. In this figure, two resonance capacitors C1A and C1B which are connected to each other in series are connected in parallel to a high-speed recovery type diode D2, and one end of the primary winding N1 of the insulating transformer is connected to the connection point between the resonance capacitors C1A and C1B. The resonance capacitors C1A and C1B are regarded as those capacitors which are obtained by dividing the resonance capacitor C1 as described above in each figure. These capacitors satisfy the following capacitance equation:

$$C1=C1A*C1B$$

In the circuit construction as described above, by varying the capacitance of each of the resonance capacitors C1A ad C1B, the power factor can be set to a variable value. Accordingly, the power factor can be improved by increasing the capacitance of the resonance capacitor C1A and decreasing the capacitance of the resonance capacitor C1B. Alternatively, the power factor can be also set to a variable value by varying inductance Li of the choke coil CH. As described above, according to this embodiment, the power factor can be easily set to any value.

Figure 11:
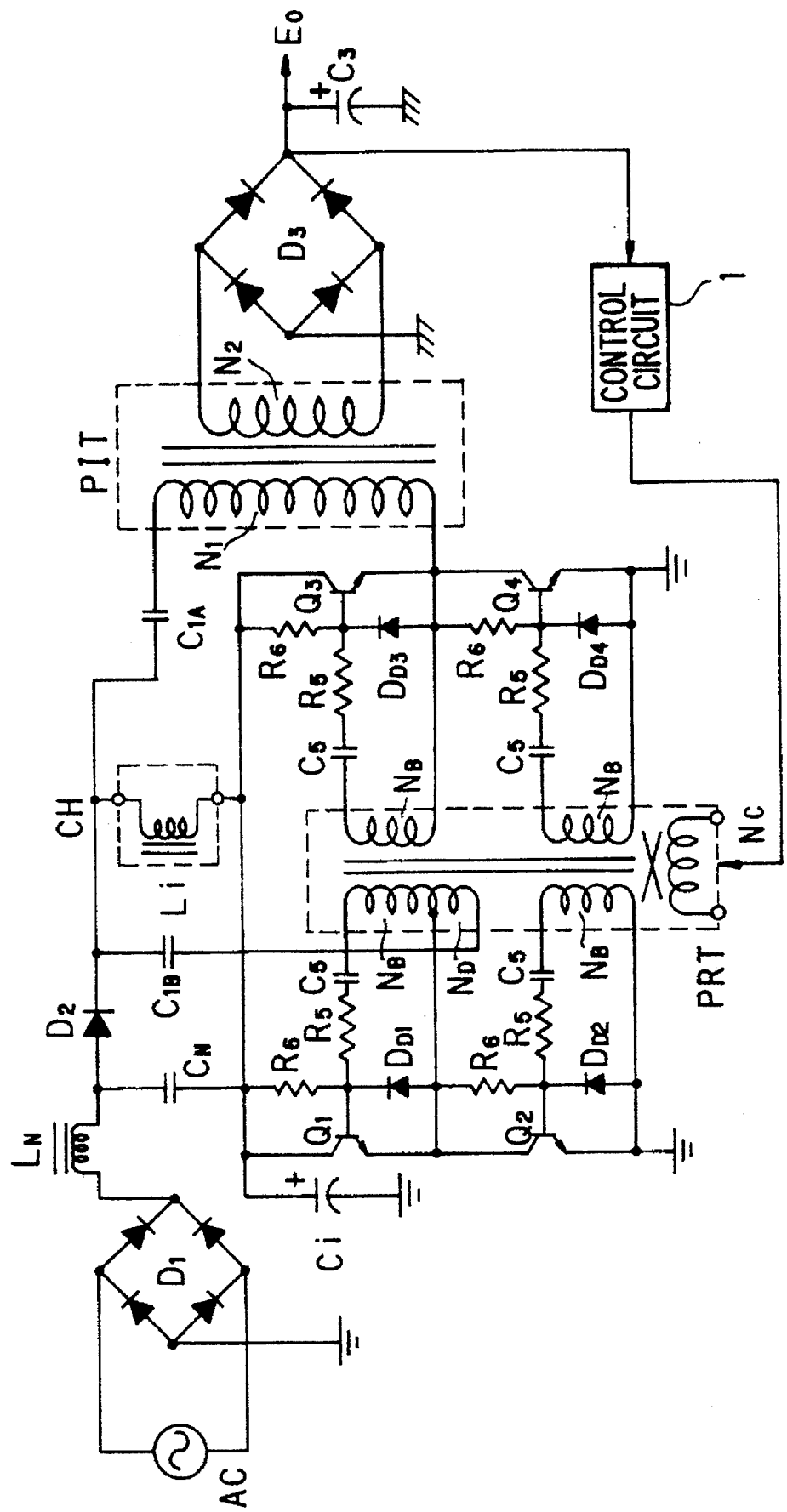
FIG. 11 is a circuit diagram showing a switching power circuit of another embodiment.

FIG. 11 is a circuit diagram showing a full bridge type of switching power circuit of self-exciting current resonance converter of another embodiment according to the present invention. As shown in FIG. 11, the circuit of this embodiment is provided with switching elements Q3 and Q4, resisters R5 and R6 for driving the switching elements Q3 and Q4, a capacitor C5, a driving winding NB, damper diodes DD3 and DD4, etc. The other same elements as FIG. 6 are represented by the same reference numerals, and the description thereof is omitted. In FIG. 11, the resonance capacitor C1 is divided into the resonance capacitors C1A and C1B like FIG. 10. The resonance capacitor C1A is inserted between the primary winding N1 and the connection point of the choke coil CH and the high-speed recovery type diode D2, and the resonance capacitor C1B is inserted between the connection point of the choke coil CH and the high-speed recovery type diode D2 and the current detection winding ND (in this case, the current detection winding ND is formed by winding up the driving winding NB of the switching element Q1).

In this circuit thus constructed, the power factor can be also set to any value by varying the capacitance of the resonance capacitor C1A, C1b or varying the inductance Li of the choke coil CH.

Figure 12:
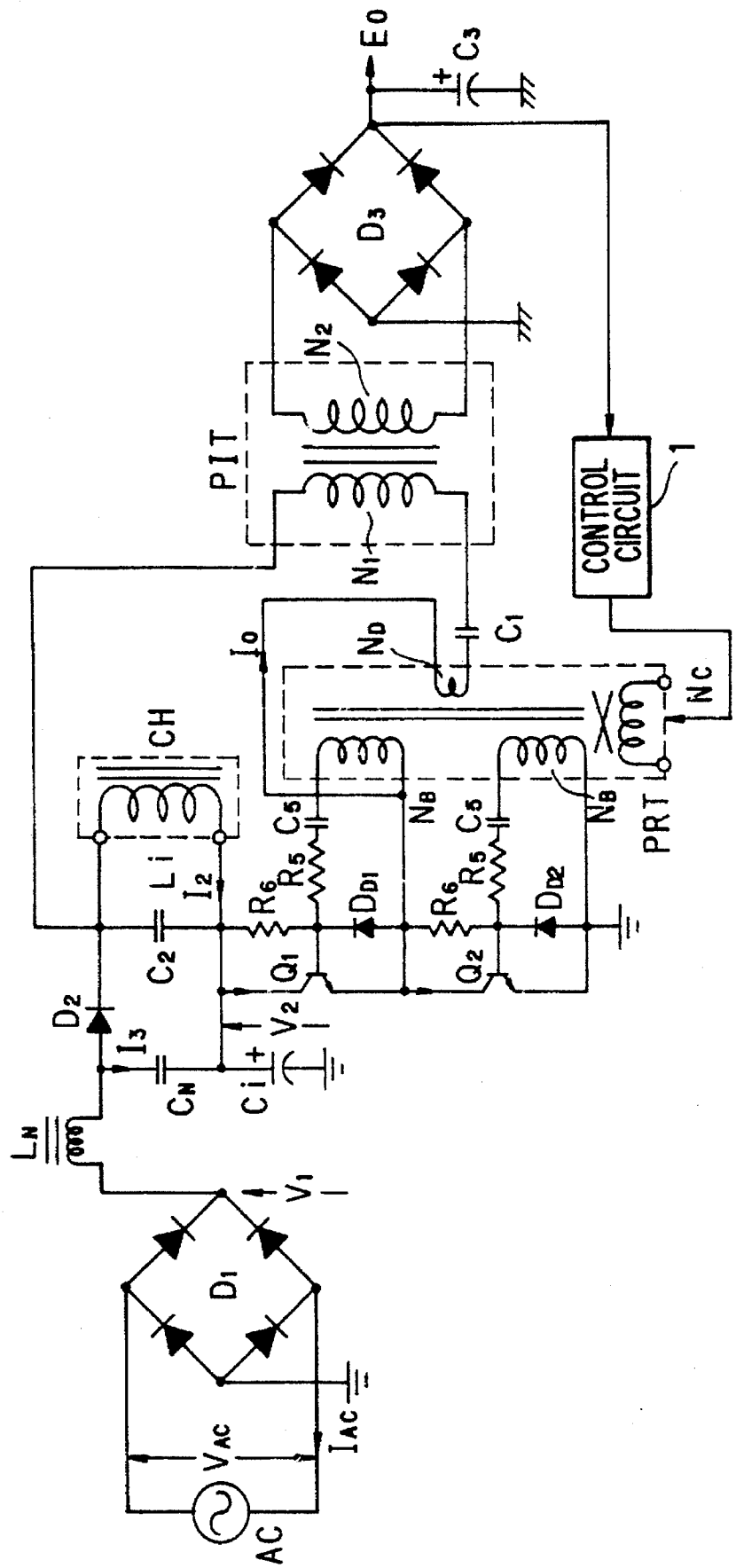
FIG. 12 is a circuit diagram showing a switching power circuit of another embodiment.

FIG. 12 is a circuit diagram showing a half bridge type of self-exciting current resonance switching power circuit of another embodiment. The same elements as FIG. 6 are represented by the same reference numerals, and the description on the switching operation, the constant-voltage control and the power factor improving operation is omitted.

In this embodiment, a parallel resonance capacitor C2 which is connected to the choke coil CH in parallel is provided to the switching power circuit shown in FIG. 6 to form a parallel resonance circuit having a desired resonance frequency together with the self-inductance Li of the choke coil CH.

Figure 13A:
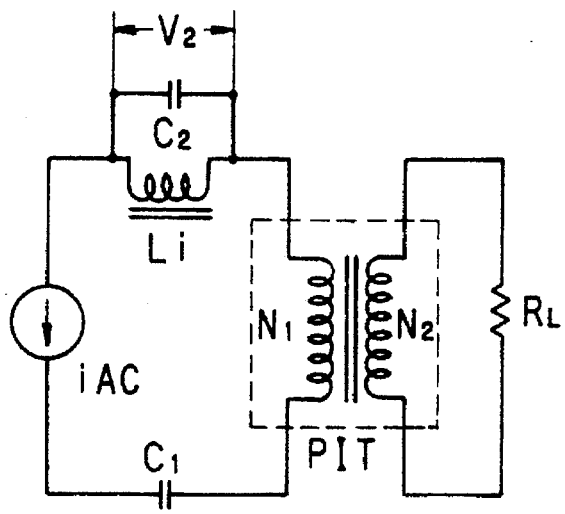
FIG. 13A is an equivalent circuit diagram to the embodiment shown in FIG. 12.

FIG. 13A shows an equivalent circuit of the switching power circuit shown in FIG. 12. In this circuit, iAC represents an alternating current source flowing in the primary winding through a switching operation, and a close circuit comprising the series resonance capacitor C1, the primary winding N1 and the inductance Li (choke coil CH) which are connected to one another in series is formed at the primary side of the insullating transformer PIT, and the parallel resonance capacitor C2 is connected to the inductance Li in parallel.

Figure 13B:
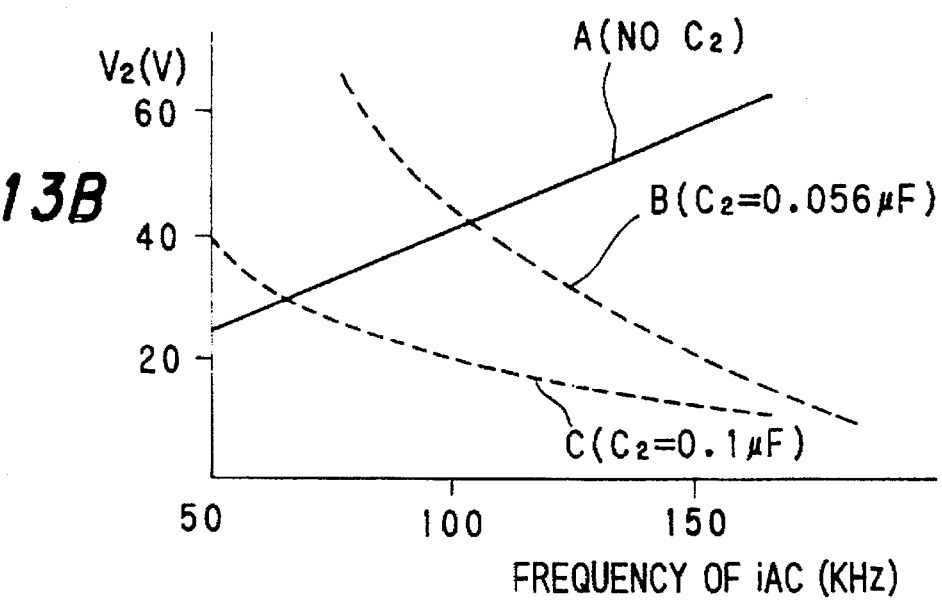
FIG. 13B shows an alternating input voltage characteristic to an alternating current source.

RL which is connected to the secondary winding N2 of the insulating transformer PIT represents a load resistance. V2 represents an alternating voltage obtained at both ends of a parallel circuit comprising the inductance Li and the series resonance capacitor C2. Furthermore, FIG. 13B represents the characteristic of the alternating voltage V2 with respect to the frequency of the alternating current source iAC, which is obtained on the basis of the equivalent circuit shown in of FIG. 13A. In FIG. 13A, a line A represents the characteristic when no parallel resonance capacitor C2 is provided (at this time, the alternating voltage V2 is equal to a voltage occurring at both ends of the inductance Li), a curve B represents the characteristic when the parallel resonance capacitor C2=0.056 µF, and a curve C represents the characteristic when the parallel resonance capacitor C2=0.1 µF. The inductance Li is set to 200 µH.

In the switching power circuit shown in FIG. 12, the output voltage E0 is kept to a constant voltage by varying the switching frequency using the drive transformer PRT as described above. In the circuit thus constructed, when the alternating input voltage VAC is high or when the load power is reduced, the frequency of the switching frequency is controlled to be increased.

Here, as is apparent from FIG. 13B, when no parallel resonance capacitor C2 is provided, the alternating voltage V2 at both ends of the inductance Li (choke coil CH) increases in synchronism with the increase of the frequency of the alternating current source iAC is increased, that is, the switching frequency. On the other hand, when the parallel resonance capacitor C2 is provided and the resonance circuit is formed as shown by the curve B or the curve C, the alternating voltage V2 at both ends of the parallel resonance circuit of Li and C2 is controlled to be lowered. Accordingly, the switching power circuit shown in FIG. 12 is provided with the parallel resonance capacitor C2 (=0.056 µF) with which the characteristic represented by the curve B in (b) of FIG. 9 can be obtained, thereby suppressing the increase of the rectifying and smoothing voltage Vi when the alternating input voltage VAC increases, or when a light load is imposed.

Figure 14:
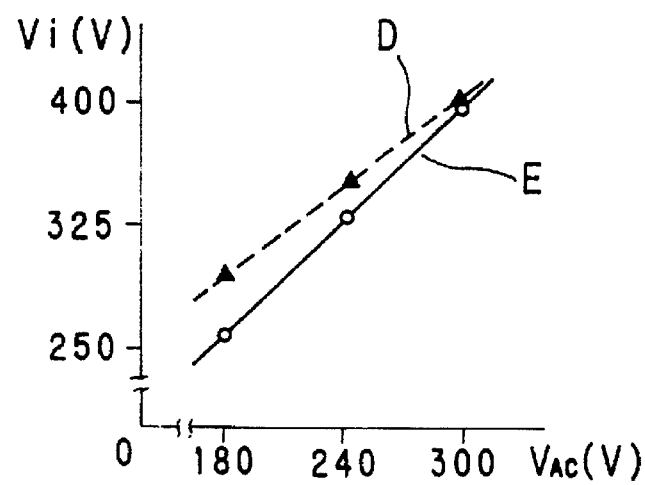
FIG. 14 is a diagram showing a rectified and smoothed voltage characteristic to the alternating input voltage of the embodiment shown in FIG. 8.

FIG. 14 shows the characteristic of the rectified and smoothed voltage Vi with respect to the alternating input voltage VAC when a light load is imposed. A line D represents the characteristic of the switching power circuit shown in FIG. 12, and a line E represents the characteristic of the switching power circuit which has the same construction as the switching converter shown in FIG. 2 and thus the power factor is not improved. As shown in FIG. 14, in the switching power circuit shown in FIG. 12, the rate of the variation of the rectified and smoothed voltage Vi to the variation of the alternating input voltage VAC is smaller than that in the circuit before the power factor is improved. Furthermore, the upper limit value (near to 300 V) of the alternating input voltage VAC is suppressed to the same level as the circuit before the power factor is improved.

For example, in a case where switching power circuits for European countries are manufactured by using the switching power circuit shown in FIG. 2, if variation of ±20% is ensured (permitted) for the alternating input voltage, the alternating input voltage VAC=220 V/±20% is ensured, that is, the alternating input voltage is ensured until VAC=288 V at maximum because Europe contains both types of countries which use the alternating input voltage VAC=220 V and 240 V. In this case, in the circuit shown in FIG. 2, the rectified and smoothed voltage Vi at the alternating input voltage VAC=288 V and under application of a light load (load power 1 W) is specifically increased by about 43 V relative to that before the power factor is improved, and thus it is equal to about 448 V. Accordingly, those parts whose breakdown voltages are improved from 400 V to 450 V are required to he selected for the electrolytic capacitor used for the smoothing capacitor Ci, the switching elements Q1 and Q2, etc., and further a part whose breakdown voltage is improved from 800 V to 1200 V is required to be used for the series resonance capacitor C1.

On the other hand, this embodiment can obtain the characteristic shown in FIG. 14, so that it is unnecessary to require high breakdown voltages for the electrolytic capacitor used for the smoothing capacitor Ci, the switching elements Q1 and Q2 and the series resonance capacitor C1. Therefore, the same standard parts as used for the circuit before the power factor is improved can be used, and thus the cost can be further reduced with improving the power factor.

Figure 15:
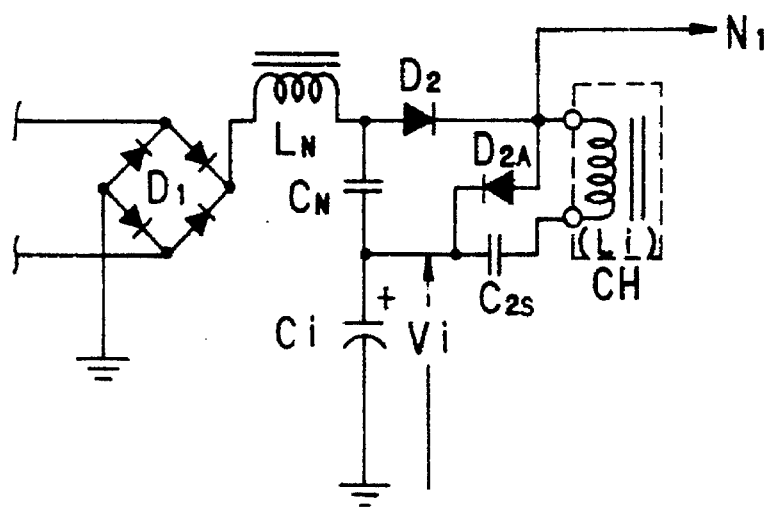
FIG. 15 is a circuit diagram showing a modification of the embodiment shown in FIG. 12.

FIG. 15 shows a rectifying and smoothing circuit which is a modification of the switching power circuit shown in FIG. 12. The other circuit elements other than those shown in FIG. 15 have the same construction as shown in FIG. 12, and thus the description thereof is omitted. The same elements as FIG. 12 are represented by the same reference numerals, and the description thereof is omitted.

In this case, a resonance capacitor C2S is inserted between one end of the choke coil CH and the anode of the smoothing capacitor Ci. With this arrangement, a series resonance circuit comprising the resonance capacitor C2S and the inductance Li of choke coil CH is provided to the full-wave rectifying line. Furthermore, a diode D2A is connected in parallel to the series resonance circuit of the resonance capacitor C2S and the choke coil CH. The diode D2A forms a continuous mode for charging the smoothing capacitor Ci with continuous current.

This continuous-mode type power-factor improved circuit can obtain the same characteristic as show in FIG. 13B when the switching frequency varies. Therefore, the upper limit of the alternating input voltage and the upper limit of the rectified and smoothed voltage Vi under application of the light load can be suppressed, and the same effect as the switching power circuit shown in FIG. 12 can be obtained.

Figure 16:
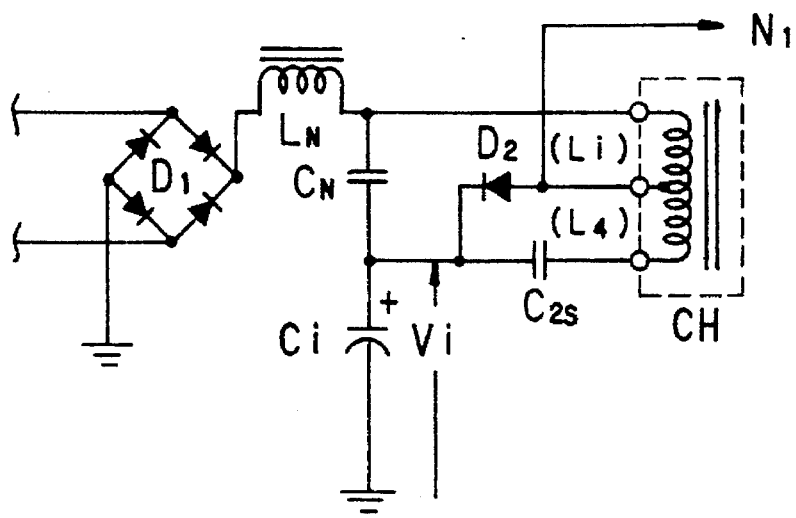
FIG. 16 is a circuit diagram showing a modification of the embodiment shown in FIG. 12.

A rectifying and smoothing circuit shown in FIG. 16 is a modification of the switching power circuit shown in FIG. 12, and it is improved to realize the switching power circuit shown in FIG. 15 by using only a diode in place of two diodes D2 and D2A. The other circuit elements as those shown in FIG. 16 are omitted from the illustration, and the same reference numerals as FIG. 12 are represented by the same reference numerals and the description thereof is omitted.

In this case, the resonance capacitor C2S is inserted between one end of the choke coil CH and the anode of the smoothing capacitor Ci. The choke coil CH is provided with a tap output terminal. The anode of a high-speed recovery type diode D2 is connected to the tap output terminal, and the cathode thereof is connected to the anode of the smoothing capacitor Ci. The primary winding N1 of the insulating transformer PIT is connected to the connection point between the tap output terminal and the anode of the high-speed recovery type diode D2 to supply the switching output to the full-wave rectifying line.

Accordingly, in this case, the series resonance circuit comprising the resonance capacitor C2, the inductance Li and L4 is provided to the rectifying and smoothing line, and with this construction, the same characteristic as shown in FIG. 13B is also obtained like the circuit shown in FIG. 15, so that the upper limit of the alternating input voltage and the increase of the rectifying and smoothing voltage Vi under application of the light load can be suppressed.

Furthermore, the present invention is applicable to a switching power circuit having a voltage doubler rectifying circuit, and the same effect as the embodiments as described above can be also obtained. An embodiment of a switching power circuit having a voltage doubler rectifying circuit will be described with reference to FIGS. 17 to 19.

Figure 17:
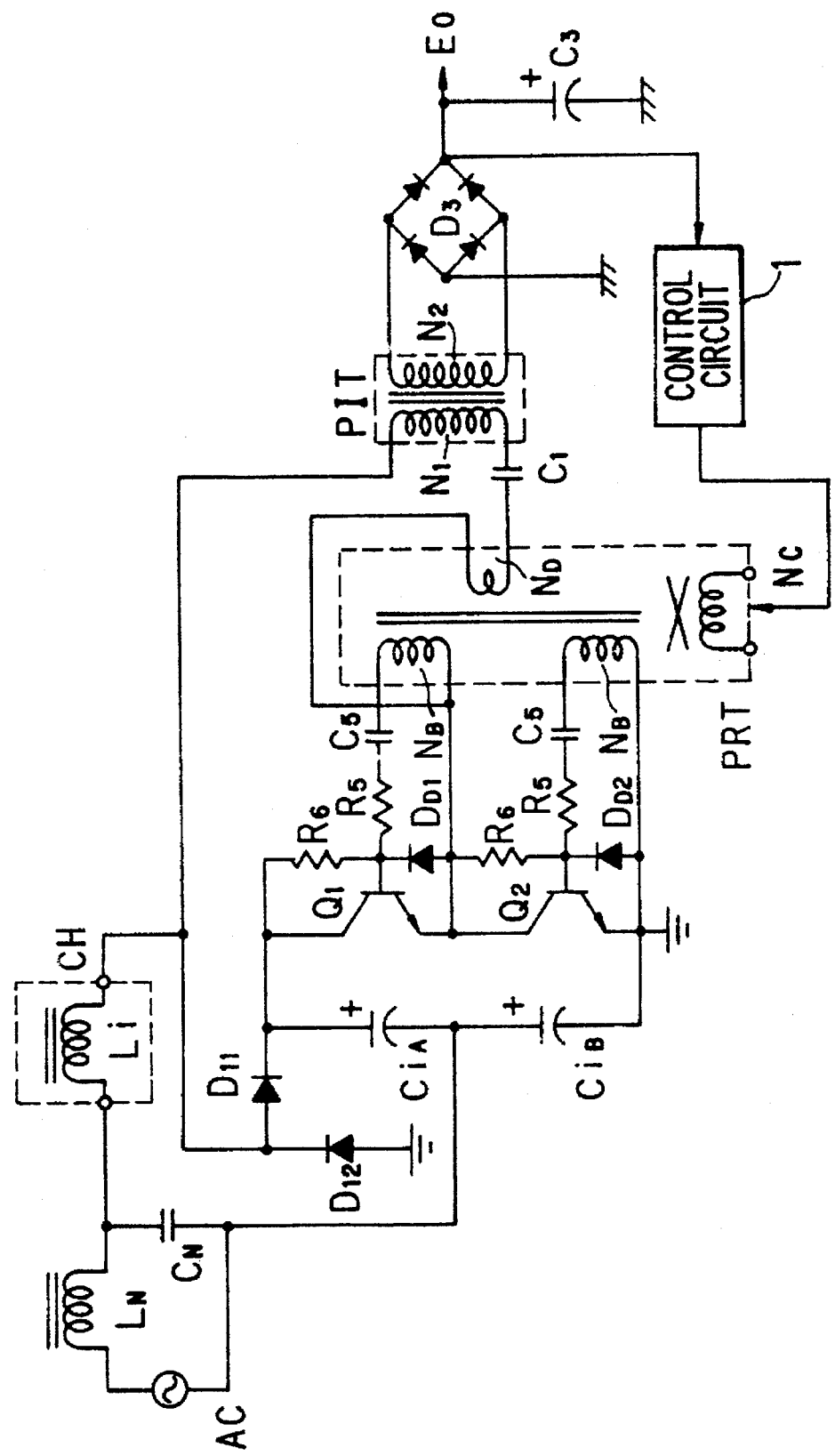
FIG. 17 is a circuit diagram showing a switching power circuit which is an embodiment having a voltage doubler rectifying circuit.

FIG. 17 is a circuit diagram showing the embodiment of the switching power circuit having the voltage doubler rectifying circuit. In this embodiment, the switching converter is of a self-exciting current resonance type, the drive transformer is designed as PRT, and the constant-voltage system based on the switching frequency control is adopted. The same elements as FIG. 6 are represented by the same reference numerals, and the description thereof is omitted.

In FIG. 17, an LC low pass filter (LN, CN) is provided to the alternating power source AC. One electrode of the alternating power source AC is connected to the anode of a rectifying diode D11 and the cathode of a rectifying diode D12 through the series-connection of the filter choke coil LN and the choke coil CH, and the other electrode thereof is connected to the connection point of the smoothing capacitors CiA and CiB. The smoothing capacitors Ci1 and Ci2 are connected in series between the rectifying and smoothing line and the ground as shown in FIG. 17. The cathode side of the rectifying diode D11 is connected to the anode of the smoothing capacitor CiA, and the anode of the rectifying diode D12 is connected to the ground. In this embodiment, one end of the primary winding N1 of the insulating transformer PIT is connected to the connection point of the choke coil CH, the anode of the rectifying diode D11 and the cathode of the rectifying diode D12 to superpose the switching output on the AC line side. In correspondence with this arrangement, a high-speed recovery type is used for the rectifying diodes D11 and D12

A voltage doubler operation of the switching power circuit is as follows. During a period when the alternating power source AC is positive, a charging path is represented as follows: alternating power source AC→filter choke coil LN→choke coil CH→rectifying diode D11→smoothing capacitor CiA→alternating power source AC, so that the smoothing capacitor CiA is charged. On the other hand, during a period when the alternating power source AC is negative, the charging path is represented as follows: alternating power source AC→smoothing capacitor CiB→rectifying diode D12→choke coil CH→filter choke coil. LN→alternating power source AC, so that the smoothing capacitor CiB is charged. With this operation, a double voltage which is obtained by summing the double-end voltages of the respective smoothing capacitors CiA and CiB is obtained as the rectified and smoothed voltage. In this embodiment, the switching output is superposed on the path which the charge current flows, through the connection point of the choke coil CH and the rectifying diodes D11 (anode) and D12 (cathode) as described above, so that the power factor can be improved by the same action as described in FIG. 6.

Figure 18:
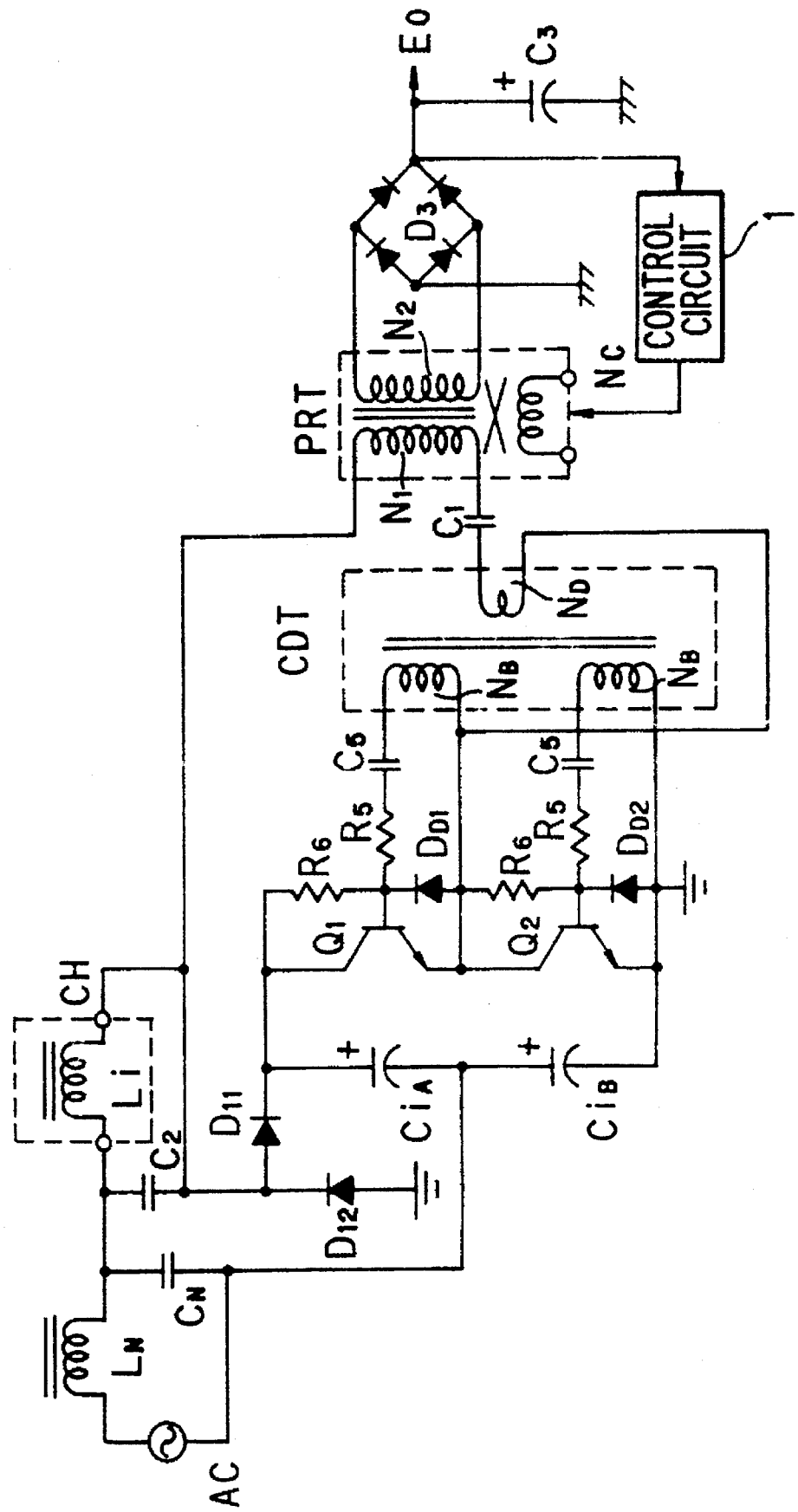
FIG. 18 is a circuit diagram showing a switching power circuit which is another embodiment having a voltage doubler rectifying circuit.

FIG. 18 is a circuit diagram showing another embodiment of the switching power circuit having the voltage doubler rectifying circuit. The same elements as FIGS. 6, 10 and 17 are represented by the same reference numerals, and the description of the switching operation, the voltage doubler operation, the power-factor improving operation, the constant-voltage control operation, etc. are omitted. In the circuit shown in FIG. 18, a parallel resonance capacitor C2 is provided in parallel to the choke coil CH, and the self-inductance Li of the choke coil CH and the parallel resonance circuit are formed on the charge path of the voltage doubler rectifying circuit. By setting the parallel resonance frequency to a value near to the lowest frequency of the switching frequency, power which is fed back through the rectifying diodes D11 and D12 is reduced under application of the light load under which the switching frequency increases, and the increase of the rectified and smoothed voltage when the alternating input voltage is high or when the light load is imposed can be suppressed as described in the circuit of the embodiment shown in FIG. 12.

Figure 19:
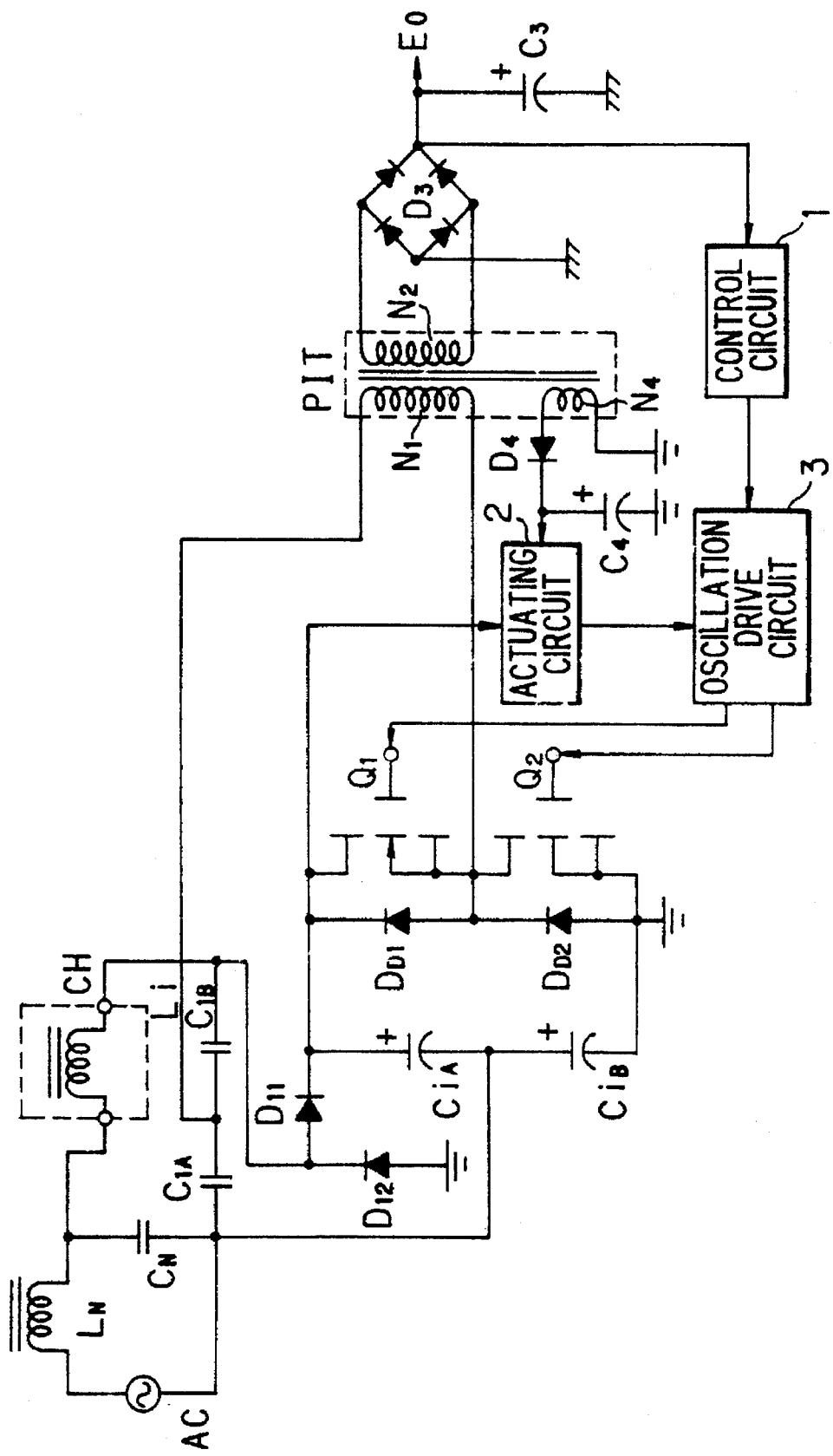
FIG. 19 is a circuit diagram showing a switching power circuit which is another embodiment having a voltage doubler rectifying circuit.

FIG. 19 is a circuit diagram showing another embodiment of the switching power circuit having the voltage doubler rectifying circuit. In the switching power circuit of FIG. 19, the switching converter is of a separately-exciting half bridge type using an MOS-FET as a switching element. The same element as FIG. 9 are represented by the same reference numerals, and the description thereof is omitted.

In this embodiment, the series resonance capacitor C1 is divided into the capacitors C1A and C1B, and these capacitors are connected to each other in series. End portion of the series resonance capacitor C1A is connected to the connection point between the smoothing capacitors CiA and CiB, and the end portion of the series resonance capacitor C1B is connected to the connect ion point of the choke coil CH and the anode and the cathode of the rectifying diodes D11 and D12. That is, the series connection of the series resonance capacitor C1A and C1B is provided to be connected in parallel to any of the rectifying and smoothing circuit for the positive period of the rectifying diode D11 and the smoothing capacitor C1A and the certifying and smoothing circuit for the negative period of the rectifying diode D12 and the smoothing capacitor C1B.

Furthermore, the end portion of the primary winding N1 is connected to the connection point of the series resonance capacitors 1A and C1B, whereby the switching output is superposed on the charging path of the voltage doubler rectifying circuit. Accordingly, in the switching power circuit, the power factor can be set to any value by varying the ratio of the electrostatic capacity of the series resonance capacitors C1A and C1B.

The power factor improving method of the present invention which are described in the respective embodiments as described above may be applied to self-exciting type/ separately exciting type as the current resonance switching power circuit, a switching frequency control system (orthogonal PRT is used as drive transformer)/series resonance frequency control system (orthogonal PRT is used as the insulating transformer), half bridge coupling type/full bridge type coupling type of switching element, and a power source circuit which is constructed by each of various combination patterns of a voltage doubler rectifying circuit, etc., and the present invention is not limited to the combination patterns which are described as the above-mentioned embodiments.

What is claimed is:

1. A current resonance type switching power source, comprising:

rectifying means for rectifying commercial power applied thereto;

smoothing means having a choke coil and a smoothing capacitor connected in series for smoothing an output of said rectifying means;

switching means for rendering intermittent a voltage output from said smoothing means; and a resonance circuit including a primary winding of an insulating transformer connected in series with a resonance capacitor and receiving a switching output of said switching means, wherein a first end of said resonance circuit is connected to an electrical signal line connected between said rectifying circuit and said smoothing means and a second end of said resonance circuit is connected to said switching means, so that the resonance output of the resonance circuit is superposed on said choke coil.

2. The switching power source as claimed in claim 1, further comprising a normal mode, low pass filter connected at an output side of said rectifying means, wherein a filter choke coil of said low pass filter is connected in series with said smoothing capacitor and said choke coil of said smoothing means in a charging path of said smoothing capacitor.

3. The switching power source as claimed in claim 2, further comprising a high-speed recovery type diode connected in series with said filter choke coil in said charging path of said smoothing capacitor.

4. The switching power source as claimed in claim 3, wherein a filter capacitor of said low pass filter is connected between one end of said filter choke coil and an anode of said smoothing capacitor.

5. The switching power source as claimed in claim 4, wherein said resonance capacitor of said resonance circuit comprises a plurality of capacitors connected to the output of said rectifying means.

6. The switching power source as claimed in claim 5, wherein said plurality of resonance capacitors are connected to said choke coil to form a resonance circuit in combination with self-inductance of said choke coil.

7. The switching power source as claimed in claim 6, wherein said rectifying means and said smoothing means cooperate to form a voltage doubler rectifying circuit.

8. The switching power source as claimed in claim 7, wherein said rectifying means comprise a high-speed recovery type diode for rectifying the commercial power.

9. The switching power source as claimed in claim 8, wherein said normal mode, low pass filter is connected so that said filter choke coil is inserted in the charging path of said smoothing capacitor of said voltage doubler rectifying circuit formed by said rectifying means and said smoothing means.

10. The switching power source as claimed in claim 9, wherein a switching frequency of said switching means is variable in response to a DC output voltage obtained at a secondary side of said insulating transformer for providing constant-voltage control.

11. The switching power source as claimed in claim 10, wherein a magnetic flux of said insulating transformer is variable in response to the DC output voltage obtained at the secondary side of said insulating transformer.

12. The switching power source as claimed in claim 11, wherein said switching means is of a separately exciting type, and a switching driving signal is variable in response to the DC output voltage obtained at the secondary side of said insulating transformer for providing the constant-voltage control.

13. The switching power source as claimed in claim 12, wherein one of a half-bridge type and full-bridge type switching element is connected to said switching means.

* * * * *